Nov. 22, 1938.   P. N. MILLER   2,137,726
MOTOR VEHICLE
Filed Dec. 20, 1934
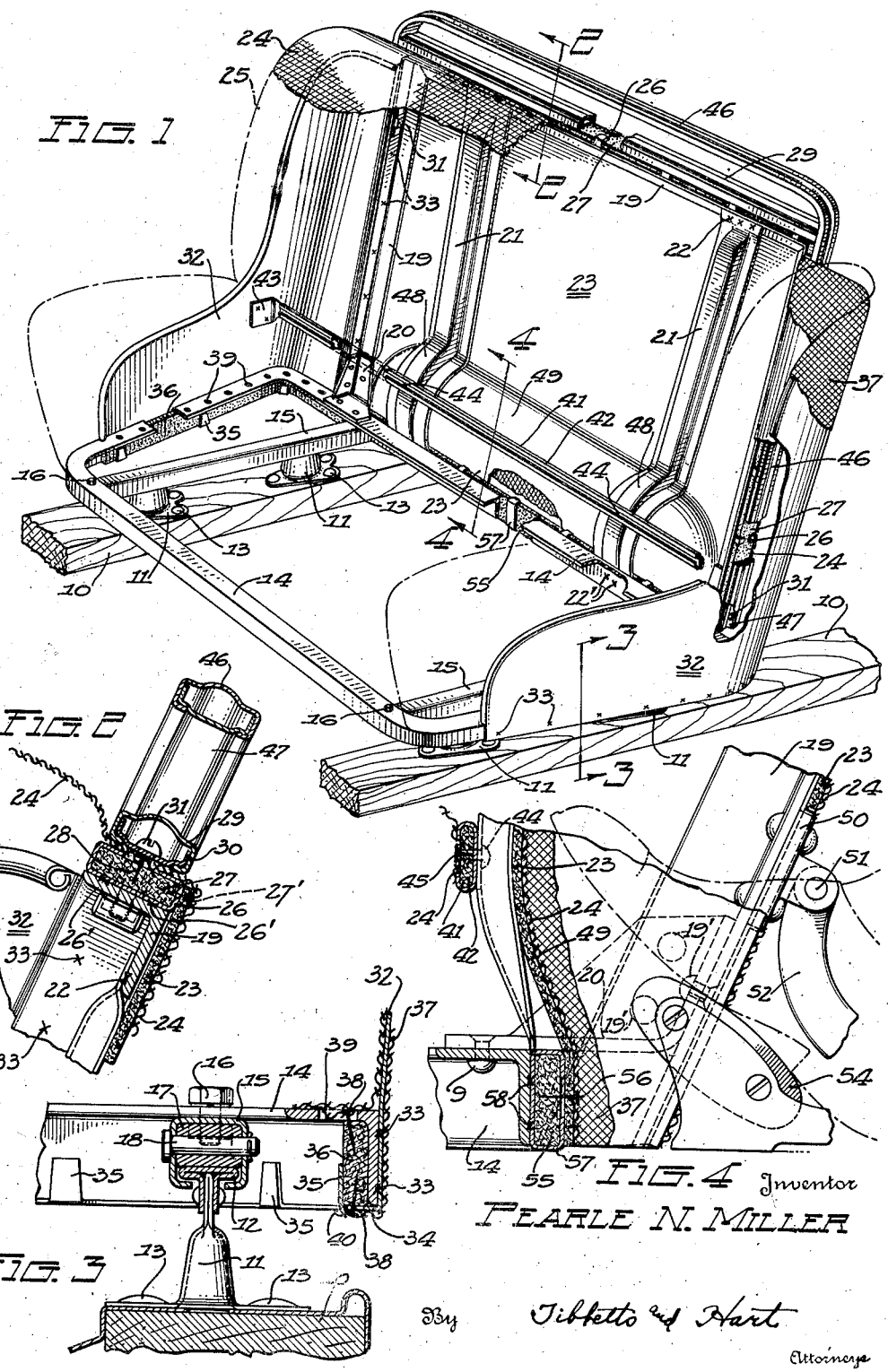
Inventor
PEARLE N. MILLER
By Tibbetts and Hart
Attorneys Patented Nov. 22, 1938

2,137,726

UNITED STATES PATENT OFFICE 2,137,726

MOTOR VEHICLE

Pearle N. Miller, Detroit, Mich., assignor to Packard Motor Car Company, Detroit, Mich., a corporation of Michigan Application December 20, 1934, Serial No. 758,422

7 Claims. (Cl. 155—184)

This invention relates to seats and more particularly to seats for use with vehicle bodies.

An object of this invention is to provide a lightweight but rugged vehicle seat structure which can be produced at low cost.

Another object of the invention is to provide a seat in which the frame structure can be readily associated and assembled.

A further object of the invention is to provide a seat structure which is formed to permit a relatively close relation, longitudinally of a vehicle, with another seat without unduly restricting the leg room therebetween.

Still another object of the invention is to provide a seat frame structure in which side arms and the back are formed and assembled in a novel manner.

Other objects of the invention will appear from the following description taken in connection with the drawing, which forms a part of this specification, and in which:

Fig. 1 is a perspective view of a seat structure incorporating the invention, portions of the structure being broken away to better illustrate some of the details;

Fig. 2 is a sectional view taken substantially on line 2—2 of Fig. 1;

Fig. 3 is a sectional view taken substantially on line 3—3 of Fig. 1;

Fig. 4 is a sectional view taken substantially on line 4—4 of Fig. 1.

Referring now to the drawing by characters of reference, 10 indicates the floor sills of a motor vehicle body on which are mounted supporting structures 11 terminating in upper rail portions 12. These supporting structures are fixed to the body sills by bolts, as indicated at 13, and serve to carry a seat structure arranged interiorly of the vehicle body.

Above the supporting structures is a seat base frame 14, formed preferably of angle iron, having a pair of longitudinally extending runways 15 fixed to the front and rear portions thereof. These runways are in channel form and are secured at their ends to the seat frame by means of bolts 16. Traversing the runways are pins 18 carrying rollers 17. The rollers bear against the rail portions 12 of the supporting structures and provide an anti-friction bearing for the seat structure so that it can be readily moved longitudinally of the vehicle into a desired position. Suitable locking means, of a conventional nature (not shown), can be associated with the seat in order to secure it in desired adjusted position longitudinally of the body.

A seat back frame is associated with the base frame and consists of a U-shaped structure 19, preferably formed of angle iron. The bottom ends of the legs of such back frame are riveted, as indicated at 19', to upstanding portions of brackets 20 which are secured to the seat frame by rivets 9. Strainers 21 extend vertically of the back frame and are secured thereto at their upper ends by welding, as indicated at 22. The lower portions of such strainers are welded to the rear portion of the base frame as indicated at 22'.

Cover means is associated with the back frame and consists of a sheet of composition board material 23 extending the full height and width of the back frame. This boarding is covered on its rear face by cloth 24, preferably glued or similarly fixed thereto, and the cloth extends beyond the top and sides of the boarding to cover the rear cushion 25, indicated by dotted lines. Along the top and side faces of the back frame a plurality of clips 26 are welded, as indicated at 26' to secure a tacking strip 27. The top and sides of the boarding 23 overlap the tacking strip and are secured thereto by tacks, as indicated at 27'. A moulding consisting of telescoping sections 29 and 30 extends over the cloth 24 overlying the upper length of the tacking strip 27, and screws 31 secure this moulding to the back frame, it being understood that the section 29 is assembled with the section 30 after the latter is fixed to the back frame.

Side arms 32 are associated with the base frame and the back frame and form a part of the seat structure. These arms are formed preferably of sheet metal material and they extend upwardly from the sides of the base frame and laterally and forwardly from the sides of the back frame. The edge portions of the arms adjacent the sides of the seat frame and the back frame are welded thereto, as indicated at 33, and the bottom edge portions 34 of the arms extend beneath the adjacent side and rear portions of the seat frame and are formed with lugs 35 which are bent upwardly to secure tacking strips 36 along the adjacent inside wall of the seat frame. The rear edge portions of the arms extend between the sides of the back frame and the clips 26.

The arms are covered by cloth, as indicated at 37, and a portion of such cloth extends beneath the seat frame and is secured to the strips 36 by tacks 38, there being openings 39 in the flange of the base frame end and openings 40 in the turned under portion 34 of the arms to receive such tacks. This cloth material can be glued or similarly fixed to the surfaces of the arms.

A moulding strip consisting of a carrier 41 having a filler 42 extends transversely of the seat structure. The flattened ends 43 of the carrier are welded to the side arms and the carrier is also fixed to the strainer members 21 by rivets or similar fastening means 44. The front face of the carrier strip 41 is slotted so that the cloth extending over the rear cushion can be secured to the filler 42 by means of tacks 45. The cloth extending over the tacking strips 27 is secured thereto by tacks 28 before being stretched over the rear cushion.

A finishing moulding consisting of telescoping sections 46 and 47 is arranged over the vertically extending side strips 27 and suitable retaining means, similar to screws 31, secure such moulding to the legs of the back frame. Such moulding projects upwardly beyond the finishing moulding secured to the top of the back frame so that the upper lengths thereof are in spaced relation. The outer finishing moulding thus forms a rail which can be grasped by the passengers of a rearwardly arranged seat or it can serve as a support for a robe or some similar article.

The lower portions 48 of the strainers 21 are curved forwardly, and the back boarding is similarly curved transversely of the seat as indicated at 49. The lower edge portion of the boarding between the strainers is fastened to a tacking strip 55 by tacks 56. This tacking strip is held by clips 57 secured to the rear of the seat frame by welding as indicated at 58. The boarding beyond the ends of the curved portion is cut out to permit brackets 50 to be riveted to the side frame portions of the back. These brackets 50 receive pins 51 associated with arms 52 supporting therebetween a foot rest 54. When the occupant of a seat, rearwardly of the one shown, places his foot upon the rest, the toe of his shoe can extend into the forwardly curved portion of the back cover. Such a passenger will therefore have more leg room than when the seat in advance is not curved forwardly, or the seats can be more closely related longitudinally without decreasing leg room when the forward seat has a forwardly curved portion.

It will be seen that the seat structure described is light in weight and rugged and can be formed and assembled at a low cost.

Although the invention has been described in connection with specific embodiments, the principles involved are susceptible of numerous other applications which will readily occur to persons skilled in the art. The invention is therefore to be limited only as indicated by the scope of the appended claims.

What is claimed is:

1. A seat frame structure comprising a metal base frame, a metal back frame fixed to the rear of said base frame, tacking stripping fixed along the top and sides of said back frame and along the rear face of said bottom frame, and a backing sheet tacked on the rear faces of said stripping.

2. A seat frame structure for supporting upper and lower upholstery units comprising a metal base frame, a metal back frame fixed to the rear of said base frame, side arms fixed to said frames, vertically extending strainers fixed to said back frame and said base frame, an upholstery tacking strip carrier extending transversely across the front of and fixed to said back frame strainers a distance above said base frame to allow for the assembly of said lower upholstery unit thereunder, the ends of said carrier being fixed to the side arms, and a tacking strip supported by said carrier to which the lower portion of said upper upholstery unit may be secured.

3. A seat frame structure for supporting upper and lower upholstery units comprising a metal base frame, a metal back frame welded to the rear of said base frame, sheet metal side arms fixed to said frames, a metal carrier strip extending transversely across the front of and secured to said back frame a distance above said base frame to allow for the reception thereunder of said lower upholstery unit, the ends of said carrier being welded to said side arms, and an upholstery tacking strip carried by said carrier for securing the lower portion of said upper upholstery unit.

4. In a seat structure, a back structure comprising a frame, tacking strip carriers welded to the sides and top of said frame, tacking strips mounted in said carriers, moulding means fixed along the outer faces of said strips, and a backing sheet fixed to the rear faces of said strips.

5. A seat frame structure comprising a metal base frame, a metal back frame fixed to the rear of said base frame, tacking strip carrier means welded to the top face of said back frame and to the rear face of said base frame, tacking strip means carried by the carrier means, and a backing sheet fixed to the rear faces of the tacking strip means in said carriers.

6. A seat frame structure comprising a metal base frame, a metal back frame fixed to the rear of said base frame, metal tacking strip carrier means welded to the top and side faces of said back frame and to the rear face of said base frame, tacking strip means mounted in said carrier means, and a backing sheet fixed to the rear faces of the strip means mounted in said carrier means.

7. A seat frame structure for supporting upper and lower upholstery units having fabric covers comprising a metal base frame, a metal back frame fixed to the rear of said base frame, tacking strip carrying means welded along the top and side edges of said back frame, tacking strips in said carrying means to which the side and top edge portions of the upper upholstery unit fabric can be secured, and a moulding fixed to the metal back frame over the outer faces of the tacking strips along the top and sides of the back frame.

PEARLE N. MILLER.